(12) United States Patent
Cho

(10) Patent No.: US 11,561,309 B2
(45) Date of Patent: Jan. 24, 2023

(54) RAY CONVERTER AND RAY DETECTION PANEL DEVICE

(71) Applicant: HKC Corporation Limited, Guangdong (CN)

(72) Inventor: En-tsung Cho, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 67 days.

(21) Appl. No.: 17/251,212

(22) PCT Filed: Dec. 27, 2019

(86) PCT No.: PCT/CN2019/129316
§ 371 (c)(1),
(2) Date: Dec. 11, 2020

(87) PCT Pub. No.: WO2020/143486
PCT Pub. Date: Jul. 16, 2020

(65) Prior Publication Data
US 2021/0247528 A1    Aug. 12, 2021

(30) Foreign Application Priority Data
Jan. 11, 2019    (CN) .......................... 201910031220.3

(51) Int. Cl.
*G01T 1/20* (2006.01)
*G01T 1/202* (2006.01)
*G01T 1/208* (2006.01)

(52) U.S. Cl.
CPC ............ *G01T 1/2006* (2013.01); *G01T 1/208* (2013.01); *G01T 1/2026* (2013.01)

(58) Field of Classification Search
CPC ..... G01T 1/2006; G01T 1/2026; G01T 1/208; G01T 1/20185; G01T 1/2023; G01T 1/20183
See application file for complete search history.

(56) References Cited

U.S. PATENT DOCUMENTS 10,725,186 B2 *   7/2020   Ohashi ................... G01T 1/202
2006/0065907 A1   3/2006   Lee et al.
(Continued)

FOREIGN PATENT DOCUMENTS

| CN | 1347506 A | 5/2002 |
|----|-----------|--------|
| CN | 102183778 A | 9/2011 |
| CN | 102419449 A | 4/2012 |
| CN | 103681701 A | 3/2014 |

(Continued)

OTHER PUBLICATIONS

International Search Report of PCT Patent Application No. PCT/CN2019/129316 dated Apr. 8, 2020.
(Continued)

*Primary Examiner* — Marcus H Taningco

(57) ABSTRACT

Disclosed are a ray converter and a ray detection panel device. The ray converter (100, 100') includes a substrate (110) and a conversion body (120). The substrate (110) includes a medium carrier. The medium carrier has a mesoporous structure distributed in an array. A pore of the mesoporous structure extends from an entrance end of the substrate (110) to an exit end of the substrate (110). The conversion body (120) is filled in the pore. The ray detection panel device includes a ray converter (100, 100') and a light sensor.

3 Claims, 4 Drawing Sheets

(56) References Cited

U.S. PATENT DOCUMENTS

| | | | |
|---|---|---|---|
| 2012/0225315 A1 | 9/2012 | Burrell et al. | |
| 2012/0248317 A1* | 10/2012 | Ohashi | G01T 1/202 250/361 R |
| 2012/0292516 A1* | 11/2012 | Yasui | G01T 1/2006 250/361 R |
| 2013/0015357 A1* | 1/2013 | Horie | G01T 1/202 250/361 R |
| 2013/0022169 A1* | 1/2013 | Iwasaki | G01T 1/202 250/366 |
| 2013/0341512 A1* | 12/2013 | Ohashi | C09K 11/616 428/221 |
| 2014/0084167 A1* | 3/2014 | Ohashi | G01T 1/202 250/361 R |
| 2014/0306258 A1* | 10/2014 | Liepold | H01L 33/502 252/582 |
| 2015/0346359 A1* | 12/2015 | Yasui | G21K 4/00 250/367 |
| 2017/0205514 A1* | 7/2017 | Yasui | G01T 1/202 |

FOREIGN PATENT DOCUMENTS

| | | | |
|---|---|---|---|
| CN | 104781692 A | 7/2015 | |
| CN | 105093259 A | 11/2015 | |
| CN | 105190360 A | 12/2015 | |
| CN | 206671574 U | 11/2017 | |
| CN | 107850676 A | 3/2018 | |
| CN | 108351425 A | 7/2018 | |
| CN | 108369282 A | 8/2018 | |
| JP | 2002090463 A | 3/2002 | |
| WO | WO-2013015454 A2 * | 1/2013 | ............ C04B 35/111 |

OTHER PUBLICATIONS

1st Office Action of counterpart Chinese Patent Application No. 201910031220.3 dated Apr. 14, 2020.

Xiao-Ju Lei et al., Preparation and Application Research on Mesoporous Material, Bulletin of the Chinese Ceramic Society, Oct. 2014, pp. 2534-2540, vol. 33, No. 10.

* cited by examiner

RAY CONVERTER AND RAY DETECTION PANEL DEVICE

CROSS-REFERENCE TO RELATED APPLICATIONS

This application claims priority to Chinese Application No. 201910031220.3, filed on Jan. 11, 2019, entitled "RAY CONVERTER AND RAY DETECTION PANEL DEVICE", the entire disclosure of which is incorporated herein by reference.

TECHNICAL FIELD

The present disclosure relates to the technical field of ray detection, in particular to a ray converter and a ray detection panel device.

BACKGROUND

The statements here only provide background information related to the present disclosure, and do not necessarily constitute related art.

The ray detection panel device is a device that converts ray energy into electrical signals that are convenient for recording and analysis, and has a wide range of applications in medical and other fields. For example, the intensity of the X-ray signal detected by the X-ray detection panel device depends on the density of the tissue in the irradiated part of the human body. In high-density tissue, the detected X-ray intensity is weaker. In the low-density tissue, the detected X-ray intensity is stronger. Thus, according to the intensity of the detected X-rays, the lesions and the like can be analyzed. The ray detection panel device can be divided into two types: direct and indirect. In the direct ray detection panel device, the distribution of the intensity of rays is obtained by directly receiving rays and converting them into the electrical signal. However, in the indirect ray detection panel device, the ray signal cannot be directly received to obtain the electrical signal, it is necessary to convert the directly received rays into visible light or other emergent light that can be detected through a ray converter, and further the emergent light of the ray converter is detected to reflect the strength of the rays. However, due to the divergence of the ray and the scattering of the ray by the converter material in the process of passing through the ray converter, the intensity of the converted light is low and the collimation is poor. On one hand, it increases the difficulty of detecting the intensity of the emergent light in the subsequent steps. On the other hand, it also increases the required radiation dose, which is likely to cause safety hazards. In summary, the detection effect of the current ray detection panel device is poor.

SUMMARY

The main objective of the present disclosure is to provide a ray converter, which aims to improve the detection effect of the radiation detection panel device.

In order to achieve the above objective, the present disclosure provides a ray converter, including a substrate and a conversion body. The substrate includes a medium carrier. The medium carrier has a mesoporous structure distributed in an array. A pore of the mesoporous structure extends from an entrance end of the substrate to an exit end of the substrate. The conversion body is filled in the pore.

In order to achieve the above objective, the present disclosure provides a ray converter, including:

a substrate including a medium carrier, the medium carrier having a mesoporous structure distributed in an array, an extension direction of a pore of the mesoporous structure being consistent, the pore extending from an entrance end of the substrate to an exit end of the substrate, a porosity of the mesoporous structure being 60% to 80%, an inner diameter of the pore being 2 nm to 10 nm; and a conversion body filled in the pore.

In order to achieve the above objective, the present disclosure provides a ray detection panel device, including:

a ray converter, including:

a substrate including a medium carrier, the medium carrier having a mesoporous structure distributed in an array, a pore of the mesoporous structure extending from an entrance end of the substrate to an exit end of the substrate;

a conversion body filled in the pore; and a light sensor located at the exit end of the ray converter to detect an emergent light emitted by the ray converter.

In technical solutions of the present disclosure, a ray converter includes a substrate and a conversion body. The substrate includes a medium carrier. The medium carrier has a mesoporous structure distributed in an array. A pore of the mesoporous structure extends from an entrance end of the substrate to an exit end of the substrate. The conversion body is filled in the pore. The pore restricts the rays incident on the ray converter from propagating along its extension direction, and interacts with the conversion body filled in the pore during the propagation process, thereby converting the rays into visible light and other emergent light for further detection. The mesoporous structure on the medium carrier limits the propagation of rays and emergent light, so that the emergent light has higher collimation. In addition, the rays and the conversion body are in full contact in the pore, thereby improving the conversion efficiency, such that the intensity of the emergent light is improved to an extent. Therefore, the ray converter of the present disclosure improves its collimation while increasing the intensity of the emergent light. On one hand, it reduces the difficulty of subsequent detection of the intensity of the emergent light, helps reduce the detection cost, and improves the detection accuracy; on the other hand, it also helps to reduce the required radiation dose, thereby improving the safety of radiation utilization, especially in the medical field, which can effectively avoid radiation received by patients and obtain better detection effects.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that, if there are directional indications (such as up, down, left, right, front, rear . . . ) in the embodiments of the present disclosure, the directional indication is only used to explain the relative positional relationship, movement, etc. between the various components in a specific posture (as shown in the figure). If the specific posture changes, the directional indication will change accordingly.

In addition, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. Besides, the meaning of "and/or" appearing in the disclosure includes three parallel scenarios. For example, "A and/or B" includes only A, or only B, or both A and B. The technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

Figure 1:
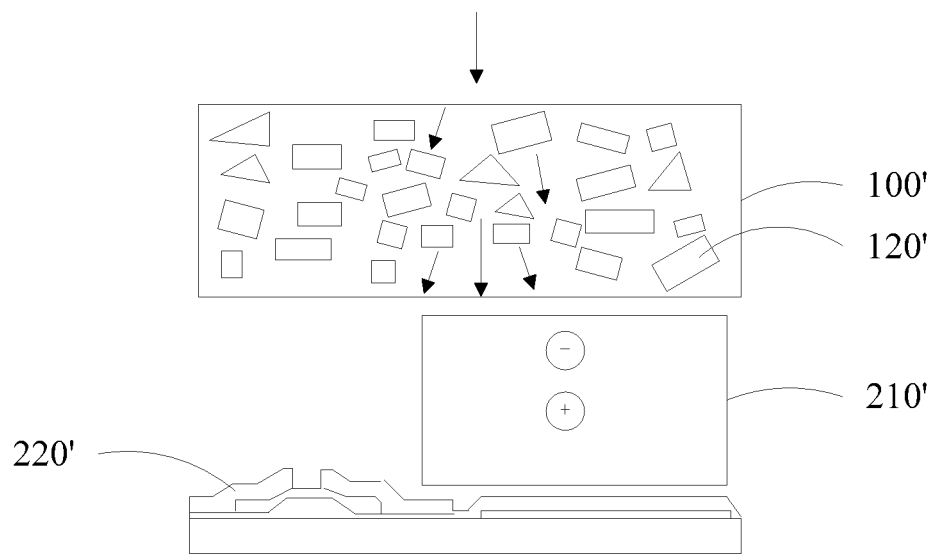
FIG. 1 is a schematic structural diagram of a ray detection panel device according to an example.

FIG. 1 is a schematic structural diagram of a ray detection panel device according to an example. As shown in FIG. 1, the ray detection panel device includes a ray converter 100' and a light sensor. The light sensor includes a photodiode 210' and a processing circuit 220'. The arrows represent the propagation direction of electromagnetic waves including rays and emergent light. In the following text, X-ray detection will be taken as an example to specifically describe the structure and working mode of the ray converter and the ray detection panel device. As shown in FIG. 1, the X-rays to be detected are irradiated from the entrance end of the ray converter 100' to the conversion body 120' therein. The X-rays to be detected interact with the conversion body 120' to be converted into lower frequency, lower energy visible light and other emergent light. The X-rays to be detected are emitted from the exit end of the ray converter 100', irradiated on the photodiode 210', and converted into electrical signals under the action of the photodiode 210'. After further optimization and analysis of the processing circuit 220', an electrical signal that can better reflect the intensity of X-rays is obtained. The conversion body 120' here is granular, however, the granular conversion body 120' easily causes scattering of electromagnetic waves propagating in the ray converter 100'. The emergent light after conversion has different propagation directions and poor collimation. Correspondingly, the intensity of the emergent light in each direction is also low.

Figure 2:
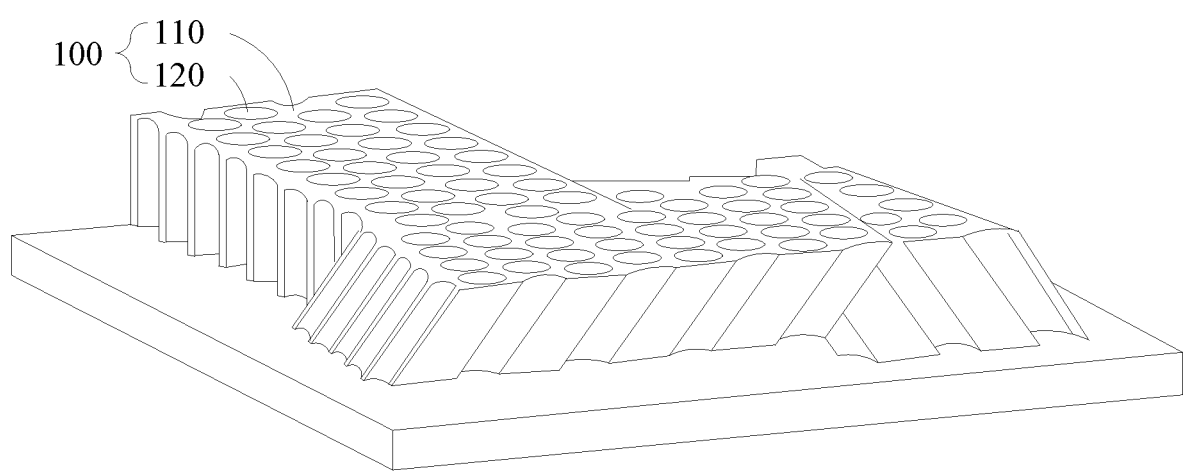
FIG. 2 is a schematic structural diagram of a ray converter according to an embodiment of the present disclosure.
Figure 3:
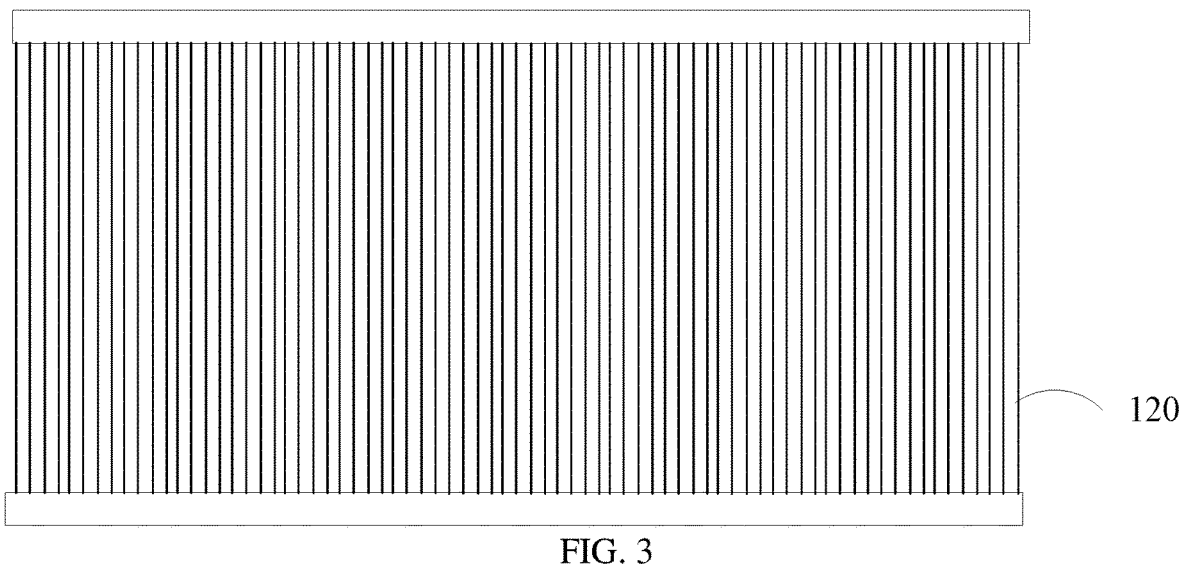
FIG. 3 is a schematic cross-sectional structural diagram of the ray converter in FIG. 2.

The present disclosure provides a ray converter, which aims to improve the collimation of the emergent light and enhance the intensity of the emergent light, thereby improving the performance of the ray detection panel device. In an embodiment of the present disclosure, as shown in FIGS. 2 and 3, a ray converter 100 includes a substrate 110 and a conversion body 120. The substrate 110 includes a medium carrier. The medium carrier has a mesoporous structure distributed in an array. A pore of the mesoporous structure extends from an entrance end of the substrate 110 to an exit end of the substrate 110. The conversion body 120 is filled in the pore.

Specially, as shown in FIG. 3, the mesoporous structure distributed in an array on the medium carrier forms a plurality of pores, and the conversion body 120 is filled in the pore. The pore extends from the entrance end to the exit end of the substrate 110, and the X-rays propagate in the pore and interact with the conversion body 120 during the propagation process, thereby forming the emergent light that can be directly detected. Generally, the wavelength range of the emergent light is 450 nm to 650 nm. As shown in FIG. 2, there are three mesoporous structures with slightly different extension directions, which is mainly related to the formation process of the substrate 110, but this slight difference in the extension direction has less influence on the collimation of the emergent light, and can effectively reduce the preparation cost of the substrate 110. In an embodiment, the substrate 110 can be made of a medium carrier with better consistency in the extension direction, thereby further improving the collimation of the emergent light. As a kind of porous structure, the mesoporous structure generally has a pore diameter between 2 nm and 50 nm, and has the characteristics of extremely high specific surface area, regular and orderly pores, narrow pore size distribution and adjustable pore size. Filling the conversion body 120 in the pore can well enhance the interaction between the X-ray and the conversion body 120, thereby improving the conversion efficiency, i.e., increasing the intensity of the emergent light. The medium carrier with the mesoporous structure may be synthesized by a molecular template synthesis method, and the molecular template synthesis method includes a hydrothermal synthesis method, a room temperature synthesis method, a microwave synthesis method, a wet glue baking method, or a phase transition method. In a specific example, the inorganic material constituting the medium carrier is dissolved in an organic solvent, under the template action of the surfactant, then the organic solvent can be removed through the medium carrier with the mesoporous structure formed by supramolecular self-assembly.

In this embodiment, a ray converter 100 includes a substrate 110 and a conversion body 120. The substrate 110 includes a medium carrier. The medium carrier has a mesoporous structure distributed in an array. A pore of the mesoporous structure extends from an entrance end of the substrate 110 to an exit end of the substrate 110. The conversion body 120 is filled in the pore. The pore restricts the rays incident on the ray converter 100 from propagating along its extension direction, and interacts with the conversion body 120 filled in the pore during the propagation process, thereby converting the rays into visible light and other emergent light for further detection. The mesoporous structure on the medium carrier limits the propagation of rays and emergent light, so that the emergent light has better collimation. In addition, the rays and the conversion body are in full contact in the pore, thereby improving the conversion efficiency, such that the intensity of the emergent light is improved to an extent. Therefore, the ray converter 100 of the present disclosure improves its collimation while increasing the intensity of the emergent light. On one hand, it reduces the difficulty of subsequent detection of the intensity of the emergent light, helps reduce the detection cost, and improves the detection accuracy; on the other hand, it also helps to reduce the required radiation dose, thereby improving the safety of radiation utilization, especially in the medical field, which can effectively avoid radiation received by patients and obtain better detection effects.

Further, a porosity of the mesoporous structure is 30% to 80%. The porosity refers to the percentage of the pore volume in the material to the total volume. Since the conversion body 120 is filled in the pores of the medium carrier, the greater the porosity of the mesoporous structure, the higher the ratio of the conversion body 120 to the medium carrier. The higher the porosity of the mesoporous structure, the more sufficient the conversion body 120 is, which helps to improve the conversion efficiency of X-rays, and the filling difficulty of the conversion body 120 is generally reduced. The lower the porosity of the mesoporous structure, the lower the difficulty of synthesis of the medium carrier, and the restriction of rays and emergent light can be improved, which helps to obtain better collimation. In an embodiment of the present disclosure, the porosity of the mesoporous structure is 30% to 80%.

In order to obtain a ray converter with higher conversion efficiency, thereby reducing the required radiation dose and increasing the intensity of the emergent light, the porosity of the mesoporous structure may be 60% to 80%.

Further, an inner diameter of the pore is 2 nm to 10 nm. When the inner diameter of the pore is smaller, the specific surface area of the medium carrier per unit volume is larger, which helps to improve the radiation conversion efficiency. However, correspondingly, the difficulty of filling the conversion body 120 will also increase. If the amount of the conversion body 120 is insufficient, the conversion efficiency of the rays will decrease. Therefore, choosing a pore with an inner diameter of 2 nm to 10 nm can get a better conversion body filling effect and radiation conversion effect.

Since the rays propagate in the pores of the medium carrier, and the emergent light is generated and propagated in the pores, the propagation of electromagnetic waves can be controlled by controlling the material refractive index of the medium carrier. Specifically, when the refractive index of the medium carrier is greater than the refractive index of the air or the conversion body in the pore, it is possible to form total reflection of electromagnetic waves, thereby achieving efficient and good collimated electromagnetic wave propagation. In this embodiment, a medium carrier with a refractive index of 1.45 to 1.5 is selected, on one hand, it can improve the transmission effect of rays and emergent light, on the other hand, its cost is relatively suitable, avoiding the situation of excessive cost.

In above embodiments of the present disclosure, the medium carrier is made of at least one of silicon oxide, silicon nitride, and zirconium oxide. Silicon oxide, silicon nitride and zirconium oxide are all common materials in semiconductor technology, and their growth and crystallization processes are relatively mature. They have a variety of crystal forms, optical parameters such as refractive index meet the basic requirements, and chemical properties are stable. Therefore, it is relatively simple and convenient to obtain the required structure of the medium carrier according to actual needs, and form a stable mesoporous structure, thereby improving the performance of the ray converter.

In above embodiments of the present disclosure, the conversion body is made of at least one of cesium iodide and sodium iodide. Cesium iodide and sodium iodide are substances sensitive to light, which can effectively convert X-rays and the like into visible light that is easy to detect. Of course, a small amount of activating substances such as thallium can be added to cesium iodide and sodium iodide to further improve the conversion effect of the converter.

Figure 4:
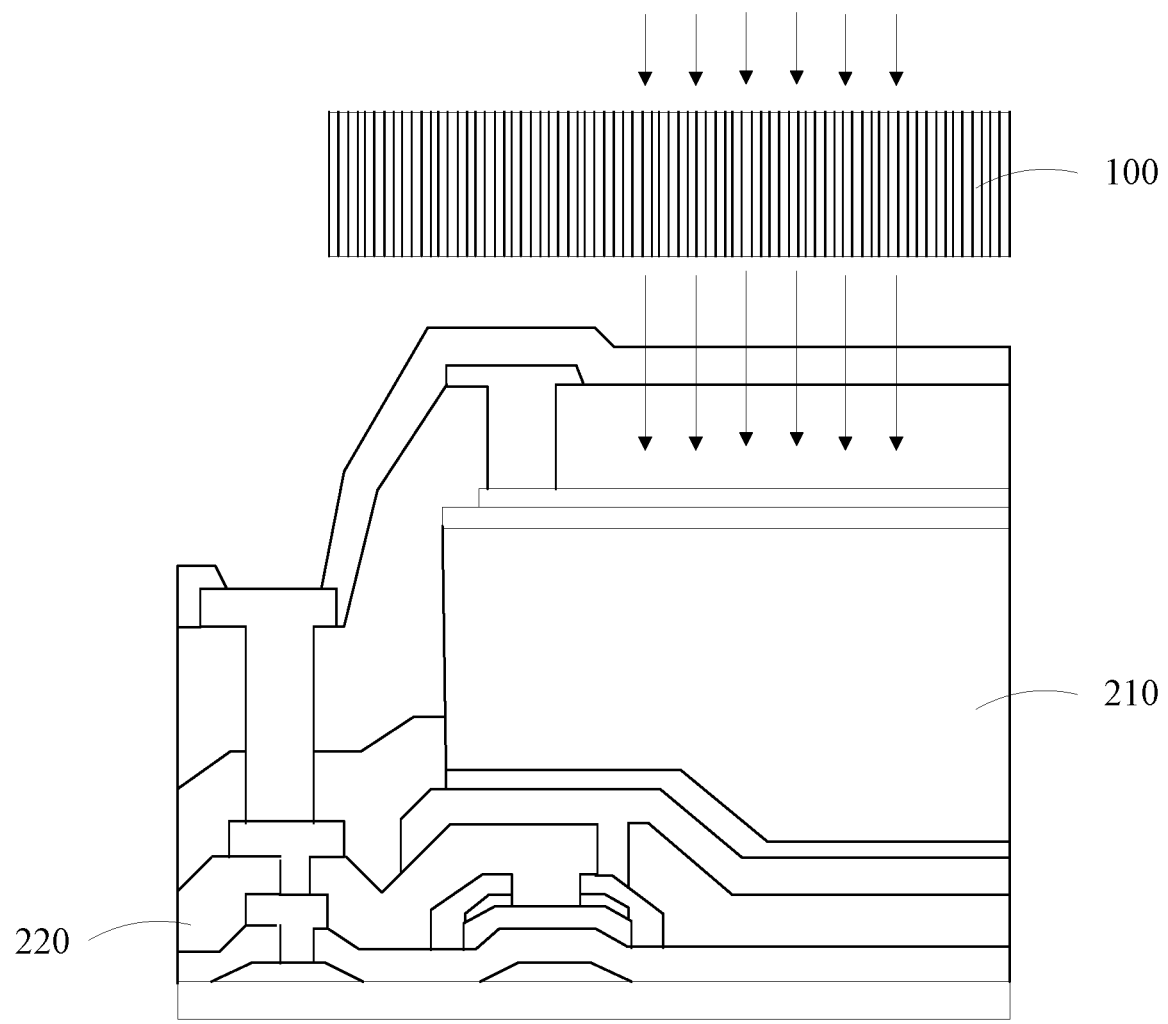
FIG. 4 is a schematic structural diagram of the ray detection panel device according to an embodiment of the present disclosure.

The present disclosure further provides a ray detection panel device. As shown in FIG. 4, the ray detection panel device includes a ray converter 100 and a light sensor. The optical sensor is located at an exit end of the ray converter 100 to detect the emergent light of the ray converter 100, and the arrows indicate the propagation direction of the ray and the emergent light. The ray detection flat panel device may be tabulate, and correspondingly, the ray converter 100 has a plate shape to receive X-rays and convert the X-rays into visible light or other emergent light for further inspection. Since the ray converter 100 restricts the propagation of the ray and the emergent light, the collimation of the emergent light is greatly improved, thereby helping to improve the subsequent detection effect. The specific structure of the ray converter 100 refers to the foregoing embodiments. Since the ray converter 100 adopts all the technical solutions of all the above-mentioned embodiments, it has at least all the beneficial effects brought by the technical solutions of the above-mentioned embodiments, which will not be repeated here.

Further, the light sensor includes a PIN photodiode 210 and an amplifier circuit 220. A sensing surface of the PIN photodiode 210 is facing the exit end of the ray converter 100. The amplifier circuit 20 is electrically connected to the PIN photodiode 210 to amplify an output electrical signal of the PIN photodiode. The PIN photodiode 210 is formed by adding an intrinsic semiconductor layer between the P region and the N region of the PN junction, that is, an I-type layer, and generates photocurrent by absorbing light radiation to realize light detection. In PIN photodiodes, the drift component in the photocurrent is dominant, its junction capacitance is small, the transit time is short, the sensitivity is high, and it has a good detection effect, so it is suitable for the ray detection panel device. Furthermore, the directly generated photocurrent is further amplified by the amplifier circuit 220, which helps to increase the signal-to-noise ratio of the current signal, thereby improving the detection effect.

The above are only optional embodiments of the present disclosure, and do not limit the scope of the present disclosure. Under the inventive concept of the present disclosure, any equivalent structural transformations made using the contents of the description and drawings of the present disclosure, or direct/indirect application in other related technical fields are included in the scope of the present disclosure.

What is claimed is:

1. A ray converter, comprising:
   a substrate comprising a medium carrier, the medium carrier having a mesoporous structure distributed in an array, a pore of the mesoporous structure extending from an entrance end of the substrate to an exit end of the substrate; and
   a conversion body filled in the pore;
   wherein:
   the medium carrier is made of at least one of silicon oxide, silicon nitride, and zirconium oxide;
   a porosity of the mesoporous structure is 30% to 80%; and
   an inner diameter of the pore is 2 nm to 10 nm.

2. A ray converter, comprising:
   a substrate comprising a medium carrier, the medium carrier having a mesoporous structure distributed in an array, an extension direction of a pore of the mesoporous structure being consistent, the pore extending from an entrance end of the substrate to an exit end of the substrate, a porosity of the mesoporous structure being 60% to 80%, an inner diameter of the pore being 2 nm to 10 nm; and a conversion body filled in the pore;

wherein the medium carrier is made of at least one of silicon oxide, silicon nitride, and zirconium oxide.

3. A ray detection panel device, comprising:

a ray converter, comprising:

a substrate comprising a medium carrier, the medium carrier having a mesoporous structure distributed in an array, a pore of the mesoporous structure extending from an entrance end of the substrate to an exit end of the substrate;

a conversion body filled in the pore; and a light sensor located at the exit end of the ray converter to detect an emergent light emitted by the ray converter;

wherein:

the medium carrier is made of at least one of silicon oxide, silicon nitride, and zirconium oxide;

the ray detection panel device is tabulate, and the ray converter has a plate shape to receive X-rays and convert the X-rays into visible light or other emergent light; and an inner diameter of the pore is 2 nm to 10 nm.

* * * * *